US008880854B2

(12) United States Patent
Hooker et al.

(10) Patent No.: US 8,880,854 B2
(45) Date of Patent: Nov. 4, 2014

(54) OUT-OF-ORDER EXECUTION MICROPROCESSOR THAT SPECULATIVELY EXECUTES DEPENDENT MEMORY ACCESS INSTRUCTIONS BY PREDICTING NO VALUE CHANGE BY OLDER INSTRUCTIONS THAT LOAD A SEGMENT REGISTER

(75) Inventors: Rodney E. Hooker, Austin, TX (US); Gerard M. Col, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 1232 days.

(21) Appl. No.: 12/369,132

(22) Filed: Feb. 11, 2009

(65) Prior Publication Data

US 2010/0205406 A1 Aug. 12, 2010

(51) Int. Cl.
*G06F 9/30* (2006.01)
*G06F 9/38* (2006.01)

(52) U.S. Cl.
CPC .......... *G06F 9/30076* (2013.01); *G06F 9/3836* (2013.01); *G06F 9/3013* (2013.01); *G06F 9/3824* (2013.01); *G06F 9/3834* (2013.01); *G06F 9/3838* (2013.01); *G06F 9/3842* (2013.01)
USPC .......... 712/220

(58) Field of Classification Search
None
See application file for complete search history.

(56) References Cited

PUBLICATIONS

Smith, James E. et al. "Implementation of Precise Interrupts in Pipelined Processors." From the companion CD-ROM to the IEEE CS Press book, "The Anatomy of a Mircoprocessor: A System Perspective" by Shriver & Smith, Jun. 1985, pp. 1-15.

*Primary Examiner* — Eddie Chan
*Assistant Examiner* — William B Partridge
(74) *Attorney, Agent, or Firm* — E. Alan Davis; James W. Huffman

(57) ABSTRACT

An out-of-order execution microprocessor executes an architectural segment register-loading instruction that instructs the microprocessor to load a new value into an architectural segment register of the microprocessor. A comparator compares the new value specified by the architectural segment register-loading instruction with a current contents of the architectural segment register. A control unit causes to be re-executed using the new value all instructions in the microprocessor that used the current architectural segment register contents as a source operand and that are newer in program order than the architectural segment register-loading instruction whenever the comparator indicates the new value does not equal the current contents. An instruction scheduler retrieves the current contents and issues for execution instructions that use the retrieved current contents, even though the instructions are newer in program order than the register-loading instruction and the register-loading instruction has not yet written the new value to the architectural segment register.

14 Claims, 2 Drawing Sheets

OUT-OF-ORDER EXECUTION MICROPROCESSOR THAT SPECULATIVELY EXECUTES DEPENDENT MEMORY ACCESS INSTRUCTIONS BY PREDICTING NO VALUE CHANGE BY OLDER INSTRUCTIONS THAT LOAD A SEGMENT REGISTER

FIELD OF THE INVENTION

The present invention relates in general to the field of microprocessors, and in particular, to register renaming therein.

BACKGROUND OF THE INVENTION

Computer programmers arrange the instructions within a computer program in a particular order, commonly referred to as program order. The programmer relies upon the processor executing the program to follow certain rules about how it performs the instructions of the program based on the program order. For a first example, assume instruction A is followed by instruction B in program order, and assume that instruction A writes to a register of the processor and instruction B reads from the same register. In this case, the programmer relies upon the processor to execute instruction B using the value written by instruction A rather than the value that was in the register prior to instruction A writing its value to the register. For a second example, assume this time that instruction A reads from the register and instruction B writes to the register. In this case, the programmer relies upon the processor to execute instruction A using the value that was in the register prior to instruction B writing its value to the register. For a third example, assume this time that both instruction A and instruction B write to the register, instruction C follows instruction B in program order, and instruction C reads the register. In this case, the programmer relies upon the processor to execute instruction C using the value written by instruction B rather than the value written by instruction A.

One way for a processor to follow the rules regarding program order discussed above is to simply execute the instructions in program order. However, many modern microprocessors, particularly pipelined superscalar microprocessors that include multiple execution units to which multiple instructions may be issued in a single clock cycle, realize performance improvements by executing instructions out-of-order, i.e., out of program order. Out-of-order execution is particularly beneficial in situations where certain instructions in the instruction stream take a long time to execute, commonly referred to as long latency instructions, such as floating point instructions or instructions that read from memory. When an in-order execution microprocessor encounters a long latency instruction, the execution units may sit idle for many timeslots—in some cases on the order of one hundred—waiting for the long latency instruction to complete. However, an out-of-order execution microprocessor attempts to find instructions that the execution units may execute while waiting for the long latency instruction to complete. These instructions are commonly referred to as independent instructions because they may be executed out of program order with respect to the long latency instruction without violating any of the rules associated with the program order, such as the three discussed above. In contrast, the out-of-order execution microprocessor must wait to execute instructions that are dependent upon any instruction that appears earlier in program order, such as the long latency instruction. Thus, it may be seen that the efficient utilization of the multiple execution units of an out-of-order execution superscalar pipelined microprocessor may be limited by the number of independent instructions that the microprocessor can find in the program's instruction stream.

One well-known technique employed by out-of-order execution superscalar pipelined microprocessors to increase the amount of independent instructions in the instruction stream is register renaming. In particular, register renaming may help instruction A and instruction B in the second and third examples above to be independent of one another such that the microprocessor may execute them out-of-order. Microprocessors include architectural registers, i.e., the registers that program instructions specify as the source of their operands or the destination of their results. For example, integer architectural registers of an x86 architecture microprocessor include the EAX, EBX, ECX, EDX, ESI, EDI, ESP, and EBP registers, among others. A microprocessor that employs register renaming includes a larger number of physical registers than the number of architectural registers. For example, an x86 processor whose architecture specifies the eight integer registers mentioned above might have 32 physical registers to which the eight architectural registers may be renamed. When the processor encounters an instruction that specifies one of the architectural registers as its destination register, renaming hardware "renames" the architectural register to one of the physical registers. When the processor executes the instruction to generate its result, the processor writes the result to the physical register. Furthermore, assume an instruction specifies one of the architectural registers as a source of an operand. The renaming hardware determines the instruction upon which the instant instruction depends, which is the newest instruction in program order that will write a result to the specified source architectural register but that is older than the instant instruction. The renaming hardware will then cause the instant instruction to refer not to the architectural register, but instead to the physical register to which the architectural register was renamed for the instruction upon which the instant instruction depends. This causes the instant instruction to receive its source operands from the appropriate renamed physical registers.

However, the improvement in performance obtained by register renaming may come at a significant cost in terms of hardware die space, power, and complexity. It is well known that this is true in many register renaming processors. Therefore, what is needed is a solution that provides a good balance to the performance/cost conflict in a superscalar out-of-order execution pipelined microprocessor.

BRIEF SUMMARY OF INVENTION

In one aspect the present invention provides an out-of-order execution microprocessor for executing an architectural segment register-loading instruction that instructs the microprocessor to load a new value into an architectural segment register of the microprocessor. The microprocessor includes a comparator that compares the new value specified by the architectural segment register-loading instruction with a current contents of the architectural segment register. The microprocessor also includes a control unit, coupled to the comparator, that causes to be re-executed using the new value all instructions in the microprocessor that used the current architectural segment register contents as a source operand and that are newer in program order than the architectural segment register-loading instruction whenever the comparator indicates the new value does not equal the current contents.

In another aspect the present invention provides an out-of-order execution microprocessor having an architectural segment register. The microprocessor includes an instruction scheduler that issues for execution a first instruction that instructs the microprocessor to load the architectural segment register with a new value. The instruction scheduler also retrieves a current value from the architectural segment register and issues a second instruction for execution using the retrieved current value, even though the first instruction is older than the second instruction in program order and the first instruction has not yet written the new value to the architectural segment register. The microprocessor also includes a control unit, coupled to the instruction scheduler, that compares the new value with the retrieved current value and, if the new value does not equal the retrieved current value, retrieves the new value from the architectural segment register and re-issue the second instruction for execution using the retrieved new value.

In yet another aspect the present invention provides a microcode routine stored in a memory of an out-of-order execution microprocessor having an architectural segment register. The microprocessor invokes the microcode routine in response to encountering an instruction that loads the architectural segment register with a new value. The microcode routine includes a first microinstruction that determines whether the new value equals a current value in the architectural segment register. The microcode routine also includes a second microinstruction that loads the new value into the architectural segment register, if the new value does not equal the current value. The microcode routine also includes a third microinstruction that causes to be re-executed using the new value all instructions in the microprocessor that are newer than the third microinstruction if the new value does not equal the current value.

In yet another aspect the present invention provides a microprocessor having a plurality of architectural segment registers. The plurality of architectural segment registers comprises first and second mutually exclusive subsets. The microprocessor includes a memory that stores first and second microcode routines. The microprocessor also includes an instruction decoder, coupled to the memory, which encounters an instruction that specifies one of the plurality of architectural segment registers for loading a new value into. The instruction decoder invokes the first microcode routine if the one of the plurality of architectural segment registers is in the first subset and invokes the second microcode routine if the one of the plurality of architectural segment registers is in the second subset. The first microcode routine unconditionally loads the new value into the one of the plurality of architectural segment registers. The second microcode routine loads the new value into the one of the plurality of architectural segment registers only if the new value does not equal a current value stored in the architectural segment register.

In yet another aspect the present invention provides a method for improving performance in a microprocessor that includes architectural segment registers, but does not include register renaming hardware for the architectural segment registers. The microprocessor is configured to execute a segment register-loading instruction that loads a new value into an architectural segment register and a memory access instruction that accesses a memory segment described by the architectural segment register. The memory access instruction follows the segment register-loading instruction in program order. The method includes retrieving a current value from the architectural segment register. The method also includes executing the memory access instruction using the retrieved current value. The method also includes determining whether the current value equals the new value, after the retrieving. The method includes loading the new value into the architectural segment register, retrieving the new value from the architectural segment register, and re-executing the memory access instruction using the new value retrieved from the architectural segment register, if the new value does not equal the current value.

In yet another aspect the present invention provides a method for executing a memory access instruction in a microprocessor. The instruction accesses a memory segment described by a segment descriptor in an architectural register of the microprocessor such that the microprocessor uses the segment descriptor to execute the memory access instruction. The method includes making a prediction that a new value to be written to the architectural register is the same as a current value stored in the architectural register. The method also includes speculatively executing the memory access instruction using the current value, rather than waiting for the microprocessor to write the new value to the architectural register, even though the memory access instruction is newer in program order than an instruction that specifies the new value to be written to the architectural register.

DETAILED DESCRIPTION OF THE INVENTION

Figure 1:
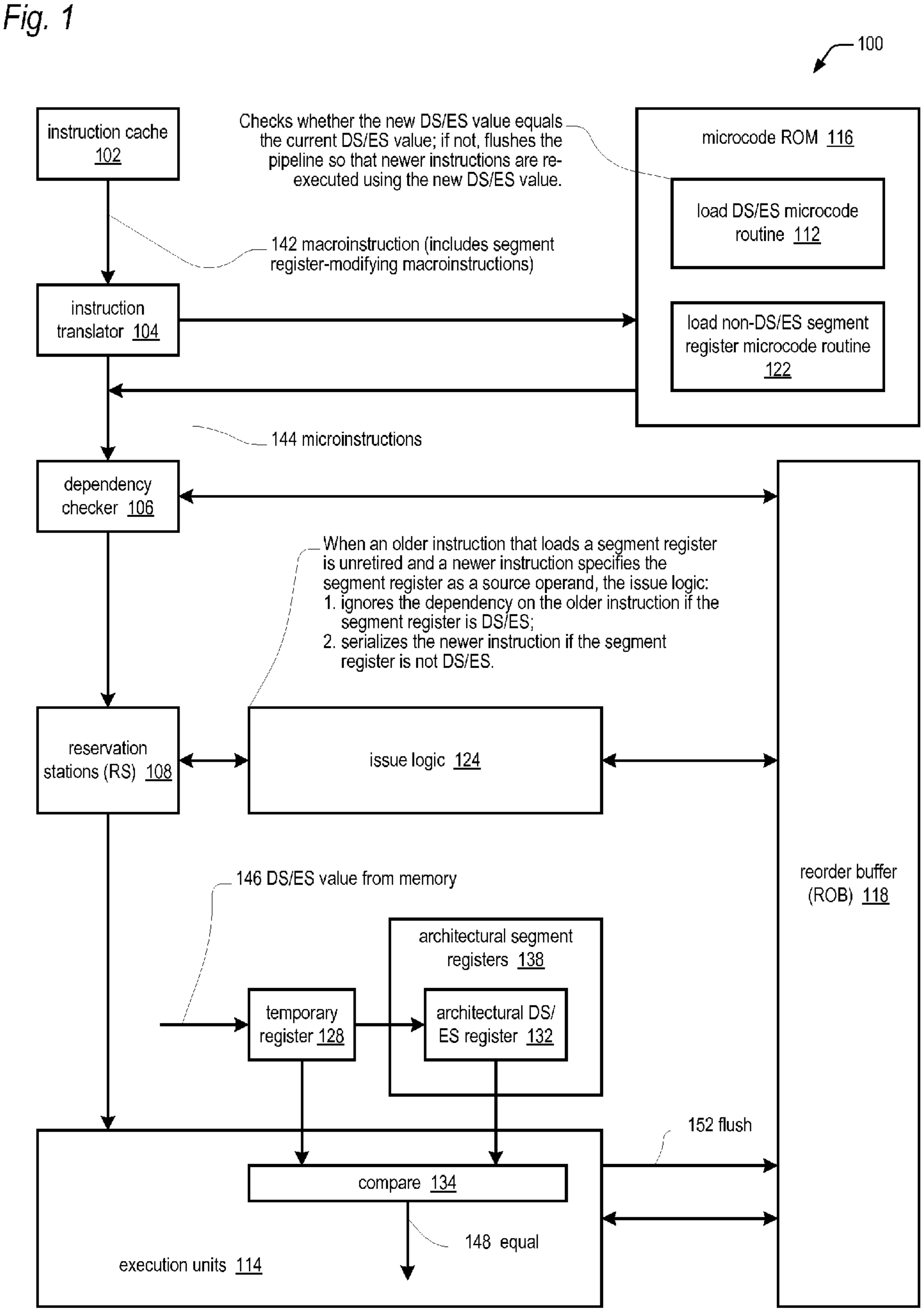
FIG. 1 is a microprocessor according to the present invention.

Referring now to FIG. 1, a microprocessor 100 according to the present invention is shown. In one embodiment, the macroarchitecture of the microprocessor 100 is an x86 macroarchitecture. A microprocessor has an x86 macroarchitecture if it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set.

The x86 user-visible register set includes segment registers 138, namely, the CS, DS, ES, FS, GS, and SS registers. The segment registers are used by programs to specify different memory segments and their attributes, such as base address, size, privilege level, default operation size, availability for use by system software, read/write/execute-ability, presence/absence in memory, and so forth. Instructions that access memory may depend on a segment register 138 value. That is, the microprocessor 100 must access the segment register 138 value to determine the attributes of the relevant memory segment in order to properly execute the memory access instructions.

The x86 segment registers 138 each store a 16-bit selector in a user-visible portion of the segment register 138 and a 64-bit segment descriptor in a hidden, i.e., non-user-visible, portion of the segment register 138. The selector is an index into a descriptor table, either a global descriptor table (GDT) or a local descriptor table (LDT), stored in system memory. The descriptor describes the memory segment, i.e., specifies its attributes, and is a local copy within the microprocessor of the descriptor from the GDT or LDT entry indexed by the selector value. The x86 instruction set includes instructions that enable a program to load the segment registers (e.g., LDS, LES, LFS, LGS, LSS, POP segment_register, and MOV segment_register). These instructions specify an operand that is the 16-bit selector value to be loaded into the selector portion of the segment register 138. In addition to loading the new selector value into the segment register 138 in response to one of these instructions, the microprocessor also reads the descriptor from the GDT or LDT entry indexed by the new selector value, and loads the descriptor into the segment register 138.

In order to reduce the complexity and power consumption of the microprocessor 100, the microprocessor 100 does not include register renaming hardware for renaming segment registers 138. That is, the microprocessor 100 does not include certain elements that would be required to accommodate register renaming of the segment registers 138, such as relevant renaming tables, scoreboard entries, dependency comparators, and forwarding buses, even though the microprocessor 100 does include these elements to accommodate register renaming of other architectural registers, such as those in the general purpose integer, floating point, and multimedia register sets. Consequently, in order to insure that the microprocessor 100 produces correct program results, if the microprocessor 100 has not yet written back the result of an older instruction that loads a value into a segment register 138, then the microprocessor 100 serializes execution of any newer instructions that depend upon the segment register-loading instruction, i.e., of any newer instructions that use the segment register 138 as a source operand. In one embodiment, the microprocessor 100 serializes execution of an instruction by waiting to issue the instruction for execution until the instruction is the oldest instruction in the microprocessor 100, i.e., until all older instructions have been retired. As one skilled in the art will appreciate, this may slow performance of the newer instructions that are dependent upon the segment register-loading instruction.

Table 1 below shows an example program fragment that illustrates the dependency situation described above.

TABLE 1

| |
|---|
| (1) LFS EBX |
| . . . |
| (2) MOV FS:[mem], EAX |

The program includes an x86 LFS instruction (load the FS segment register with the contents of the EBX register and load the selected segment descriptor from the appropriate descriptor table into the hidden portion of the segment register) followed in program order (although not necessarily sequentially) by an x86 MOV instruction that stores the contents of the EAX register to a memory location that is within a memory segment that is described by the FS segment register descriptor, as indicated by the segment override notation in the assembly language code. The MOV instruction in line (2) is dependent upon the LFS instruction in line (1) since the MOV instruction uses the FS register descriptor value written by the LFS instruction.

However, advantageously, the present inventors observed of various programs that when the programs execute an instruction that loads a new value into the DS or ES segment registers 132 specifically, the new value is frequently the same as the old value. Taking advantage of that observation, the microprocessor 100 of the present invention does not serialize instructions dependent upon a DS/ES-loading instruction. Rather, the microprocessor 100 "predicts" that the new DS/ES value loaded by the DS/ES-loading instruction is the same as the old DS/ES value. That is, the microprocessor 100 allows the dependent instructions to issue to execution and use the old value from the architectural DS/ES register without waiting to receive the new value from the DS/ES-loading instruction. In order to check the prediction to insure that the microprocessor 100 generates correct program results, the microprocessor 100 also checks to verify that the prediction was correct, i.e., that the new value equals the old value, before allowing the dependent instruction that uses the old DS/ES value to update architectural state. If the new value does not equal the old value, the microprocessor 100 flushes the pipeline, including the dependent instructions, after loading the new value into the architectural DS/ES register so that the dependent instructions re-execute using the new value. In this sense, the microprocessor 100 may be said to speculatively execute the dependent instructions.

Table 2 below shows an example program fragment that illustrates the situation described above in which the microprocessor 100 will speculatively execute a dependent memory access instruction that uses the ES register by predicting that an older segment register-loading instruction will write the same value into the ES register as the current value in the ES register.

TABLE 2

| |
|---|
| (3) LES EBX |
| . . . |
| (4) MOV ES:[mem], EAX |

The program fragment in Table 2 is similar to the fragment in Table 1, except that it involves the ES register rather than the FS register. The program includes an x86 LES instruction (load the ES segment register with the contents of the EBX register) followed in program order (although not necessarily sequentially) by an x86 MOV instruction that stores the contents of the EAX register to a memory location that is within a memory segment that is described by the ES segment register, as indicated by the segment override notation in the assembly language code. The MOV instruction in line (4) is dependent upon the LES instruction in line (3) since the MOV instruction uses the ES register value written by the LES instruction.

The microprocessor 100 includes an instruction cache 102, coupled to an instruction translator 104; a dependency checker 106, coupled to the instruction translator 104; a microcode ROM 116, coupled to the instruction translator 104 and dependency checker 106; reservation stations 108, coupled to the dependency checker 106; issue logic 124, coupled to the reservation stations 108; execution units 114, which include a comparator 134, coupled to the reservation stations 108; the architectural segment registers 138, which include the DS/ES segment registers 132, coupled to the execution units 114; a temporary register 128, coupled to the execution units 114 and architectural segment registers 138; and a reorder buffer (ROB) 118, coupled to the dependency checker 106, issue logic 124, and execution units 114. In one embodiment, the execution units 114 includes a load/store unit (not shown) that execute memory access instructions. The load/store unit uses the segment descriptor values in the segment registers 138 to execute the memory access instructions. The instruction cache 102 caches program instructions from system memory (not shown), including memory access instructions and instructions that load segment registers 138.

The microprocessor 100 also includes an instruction translator 104 that receives instructions 142 from the instruction cache 102. In one embodiment, the instructions are referred to as macroinstructions 142 because they are instructions from the macroinstruction set of the microprocessor 100, such as the x86 architecture instruction set. The instruction translator 104 translates the macroinstructions 142 into microinstructions 144, which are instructions of the microinstruction set of the microarchitecture of the microprocessor 100. In particular, the instruction translator 104 translates macroinstructions 142 that access memory into load/store microinstructions that may be dependent upon a segment register-loading instruction.

The microprocessor 100 also includes a microcode ROM 116 that stores microcode routines. In particular, the microcode routines include routines 112 and 122 that implement macroinstructions 142 that load a segment register 138. A microsequencer of the microprocessor 100 (not shown) fetches the instructions of the load DS/ES segment register microcode routine 112 and the load non-DS/ES segment register microcode routine 122, which the microsequencer provides to subsequent stages of the microprocessor 100 pipeline. Invocation of the segment register-loading microcode routines 112/122 will now be described with respect to FIG. 2.

The microprocessor 100 performs out-of-order execution. That is, the execution units 114 may execute instructions out of the original program order. In particular, the dependency checker 106 receives instructions 144 from the instruction translator 104 in a particular order that is preserved in the ROB 118 so that the instructions may be retired in that order. However, the execution units 114 may execute the instructions 144 out of this order. Consequently, according to the present invention (as described below with respect to block 308 of FIG. 3, for example), a memory access instruction that is dependent upon the DS/ES register 132 value written by an older DS/ES-loading instruction with respect to the original program order may actually be executed by the execution units 114 before the older DS/ES-loading instruction writes the new value to the DS/ES register 132.

Figure 2:
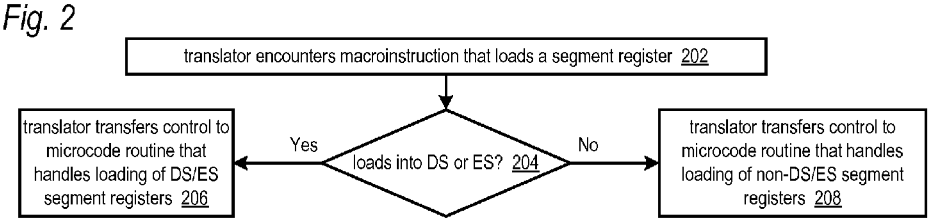
FIGS. 2 through 4 are block diagrams illustrating operation of the microprocessor of FIG. 1 according to the present invention.

Referring now to FIG. 2, a block diagram illustrating operation of the microprocessor 100 of FIG. 1 according to the present invention is shown. Flow begins at block 202.

At block 202, the instruction translator 104 of FIG. 1 encounters a macroinstruction 142 that loads a segment register 138, such as the LFS instruction in line (1) of Table 1 or the LES instruction in line (3) of Table 2 above. Flow proceeds to decision block 204.

At decision block 204, the instruction translator 104 determines whether the destination segment register is DS or ES. If the destination segment register is DS or ES, flow proceeds to block 206; otherwise, flow proceeds to block 208.

At block 206, the instruction translator 104 halts translating macroinstructions 142 and temporarily transfers control to the load DS/ES microcode routine 112 of FIG. 1. The load DS/ES microcode routine 112 is described below, particularly with respect to FIG. 4. Flow ends at block 206.

At block 208, the instruction translator 104 halts translating macroinstructions 142 and temporarily transfers control to the load non-DS/ES microcode routine 122 of FIG. 1. The load non-DS/ES microcode routine 122 includes microinstructions which, among other things, load the new value specified by the non-DS/ES-loading macroinstruction 142 into the non-DS/ES segment register and then return control back to the instruction translator 104. Flow ends at block 208.

Referring again to FIG. 1, the microprocessor 100 also includes a dependency checker 106 that receives the microinstructions 144 from the instruction translator 104 and from the microcode ROM 116. The dependency checker 106 allocates an entry in the ROB 118 for each instruction. The ROB 118 entries are allocated in program order, which enables the ROB 118 insure that the instructions are retired in program order. The dependency checker 106 also generates dependency information for each instruction and provides the dependency information for the instruction to the ROB 118 for storage into the ROB 118 entry associated with the instruction. The dependency checker 106 then provides the instruction to the reservation stations 108 where it waits until the issue logic 124 determines that it is ready to be issued to the execution units 114 for execution. The ROB 118 updates the status of each instruction, such as to indicate that the instruction has been issued, completed execution, or been retired, which the issue logic 124 also uses to determine whether an instruction is ready to be issued.

More specifically, the dependency checker 106 keeps track of the result destination register for every unretired instruction in the microprocessor 100. When the dependency checker 106 receives an instruction, it looks at the source operand registers—such as a segment register 138—used by the instruction and determines, for each source operand, which one of any older unretired instructions—such as a segment-loading instruction—will be writing to the source operand register and indicates that the instruction is dependent on the older unretired instruction. If the dependency checker 106 finds multiple unretired instructions that write to the source register, the dependency checker 106 determines which of these is the newest, and indicates that the instruction is dependent upon the newest of these instructions.

The issue logic 124 uses the dependency information generated by the dependency checker 106 to decide which instructions in the reservation stations 108 are ready to be issued to the execution units 114 for execution. Generally, the issue logic 124 waits to issue an instruction until all the instructions have retired (i.e., updated their destination registers with their results) upon which the dependency information indicates the instruction is dependent for its source operands. To be more precise, the microprocessor 100 may forward the results to the dependent instruction via forwarding buses and/or the renaming registers; that is, the results may be available such that the issue logic 124 may issue the dependent instruction before the result-supplying instruction has actually updated the architectural register and retired. Nevertheless, the result-supplying instruction indicated by the dependency information has to have generated its result and made the result available to the dependent instruction before the issue logic 124 can issue the dependent instruction to the execution units 114. Further operation of the issue logic 124 will now be described with respect to FIG. 3.

Figure 3:
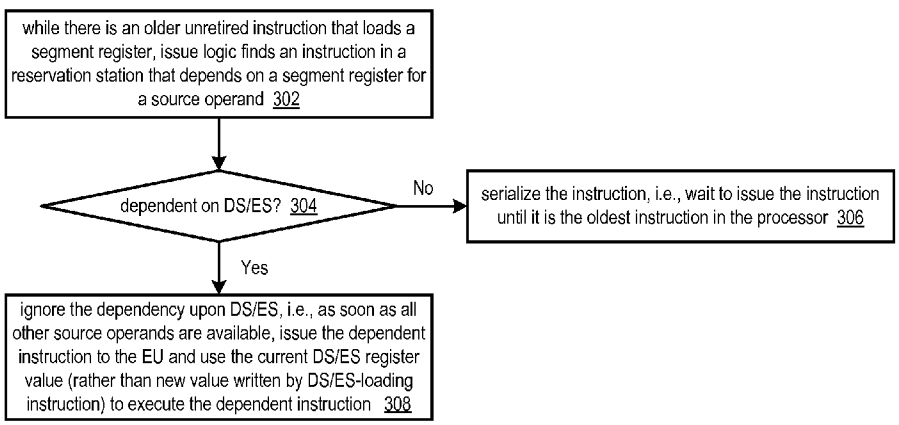

Referring now to FIG. 3, a block diagram illustrating operation of the microprocessor 100 of FIG. 1 according to the present invention is shown. Flow begins at block 302.

At block 302, the issue logic 124 determines that there is an instruction in one of the reservation stations 108 that is dependent upon an instruction that loads one of the segment registers 138. That is, the issue logic 124 determines that the instruction is a memory reference instruction (such as the MOV instructions in line (2) of Table 1 or line (4) of Table 2 above) such that the microprocessor 100 must access a segment register 138 to execute and the segment register 138 is a destination register of an older unretired instruction. Flow proceeds to decision block 304.

At decision block 304, the issue logic 124 determines whether the dependent instruction is dependent upon the DS/ES register 132 or upon a non-DS/ES segment register 138. If the dependent instruction is dependent upon the DS/ES register 132, flow proceeds to block 308; otherwise, flow proceeds to block 306.

At block 306, as mentioned above, the issue logic 124 serializes execution of the instruction that is dependent upon the instruction that loads a non-DS/ES segment register. In one embodiment, the dependency checker 106 generates dependency information that indicates the dependent instruction is dependent upon itself to accomplish the serialization. That is, when the dependency information indicates the dependent instruction is dependent upon itself, the issue logic 124 will wait to conclude that the dependent instruction is ready to issue to the execution units 114 until the dependent instruction is the oldest instruction in the microprocessor 100, as indicated by the ROB 118. In particular, because the execution units 114 execute instructions out-of-order, if the dependency checker 106 and issue logic 124 did not serialize the dependent instruction, then the load/store unit might execute it using a stale segment descriptor value. However, the serialization insures correct program operation even though the microprocessor 100 does not include register renaming hardware for the segment registers 138, as mentioned above, because it insures that the dependent instruction does not issue until it can receive the most recent value of the segment descriptor from the segment register 138. The MOV instruction in line (2) of Table 1 is an example of an instruction that the microprocessor 100 would serialize because it is dependent on the non-DS/ES segment register-loading instruction in line (1) of Table 1. Flow ends at block 306.

At block 308, the issue logic 124 ignores the memory access instruction's dependency upon the DS/ES register 132. That is, as soon as all other conditions are satisfied for the dependent instruction to be ready to issue (e.g., the load/store unit is available and all other source operands are available besides the DS/ES register 132 value), the issue logic 124 issues the instruction to the execution units 114 and the DS/ES register 132 provides its current value to the execution units 114 to be used by them to execute the memory access instruction. Effectively, the issue logic 124 predicts that the current value of the DS/ES register 132 is the same as the new value that will be written to the DS/ES register 132 by the DS/ES-loading instruction upon which the memory access instruction depends and speculatively executes the dependent memory access instruction. Advantageously, by making this prediction and going ahead and issuing the dependent instruction, the microprocessor 100 potentially reduces the time required to execute the program that includes the DS/ES-loading instruction and its dependent memory access instructions. The MOV instruction in line (4) of Table 2 is an example of an instruction that the microprocessor 100 would speculatively execute because it is dependent on the DS/ES segment register-loading instruction in line (3) of Table 2. Flow ends at block 308.

Table 3 includes pseudo-code describing relevant portions of the load DS/ES microcode routine 112 of FIG. 1. The pseudo-code will be discussed with respect to FIG. 4.

TABLE 3

```
(1) load Temp, [New Descriptor Address]
(2) compare Temp, DS
(3) if (Temp == DS) {
(4)         done;
(5) } else {
(6)         move Temp-->DS
(7)         branch to Next Instruction ;causes a pipeline flush
(8)         done;
(9) }
```

Figure 4:
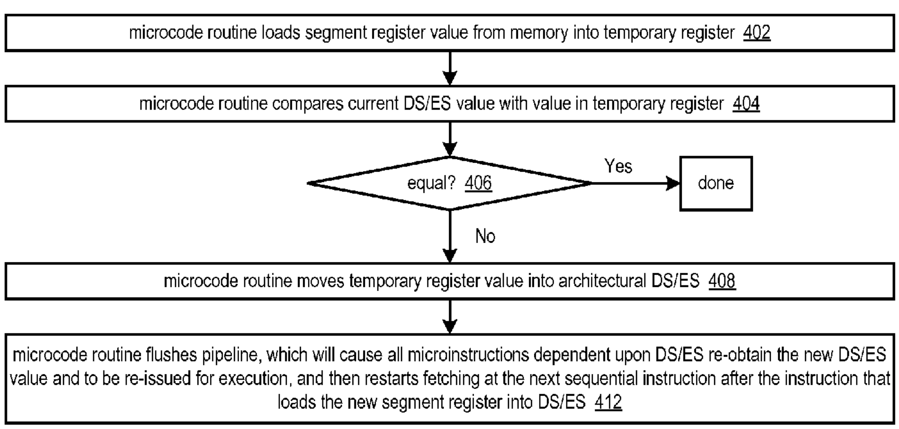

Referring now to FIG. 4, a flowchart illustrating operation of the microprocessor 100 of FIG. 1 according to the present invention is shown. Flow begins at block 402.

At block 402, the translator has transferred control to the load DS/ES microcode routine 112 in response to encountering an instruction that loads the DS/ES register 132 of FIG. 1 with a value, as described above with respect block 206 of FIG. 2. The routine 112 first loads the value specified by the instruction into the temporary register 128 of FIG. 1, as shown in line (1) of Table 3. Flow proceeds to block 404.

At block 404, the microcode routine 112 compares the current value in the architected DS/ES register 132 of FIG. 1 with the value that was loaded into the temporary register 128 at block 402, as shown in line (2) of Table 3. Flow proceeds to decision block 406.

At decision block 406, the routine 112 determines whether the current value in the architected DS/ES register 132 of FIG. 1 equals the value that was loaded into the temporary register 128, as shown in line (3) of Table 3. If so, flow ends, as shown in line (4) of Table 3; otherwise, flow proceeds to block 408, as shown in line (5) of Table 3.

At block 408, because the current value in the architected DS/ES register 132 of FIG. 1 does not equal the value that was loaded into the temporary register 128 (which is the new value to be loaded by the DS/ES-loading instruction), the routine 112 moves the temporary register 128 value into the architectural DS/ES register 132, as shown in line (6) of Table 3. It is noted that the microinstruction 144 that performs the action in line (6) of Table 3 is the instruction of the load DS/ES microcode routine 112 that actually writes the new value to the DS/ES register 132. Thus, the dependent memory access instruction described at block 308 is dependent upon the instruction in line (6), and the issue logic 124 ignored the dependency and predicted that the new DS/ES register 132 value written by the instruction in line (6) is equal to the old DS/ES register 132 value that was used by the dependent memory access instruction described at block 308. However, in this case it was determined at decision block 406 that the prediction was wrong, i.e., the new DS/ES register 132 value written by the instruction in line (6) is not equal to the old DS/ES register 132 value that was used by the dependent memory access instruction described at block 308; therefore, the memory access instruction may have been executed with the wrong DS/ES register 132 value, and the misprediction must be corrected to insure that the microprocessor 100 produces correct program results. Flow proceeds to block 412.

At block 412, in order to correct the misprediction made at block 308 of FIG. 3, the routine 112 flushes the pipeline of all instructions newer than the instruction at line (6) of Table 3, which includes the dependent memory access instruction, such as the MOV instruction in line (4) of Table 2. The routine then restarts fetching instructions at the next sequential macroinstruction after the macroinstruction 142 encountered at block 202 that loads the architectural DS/ES register 132, such as the LES instruction in line (3) of Table 2 above. This causes the dependent memory access instruction to be correctly re-issued and re-executed using the new value of the DS/ES register 132 that was written at block 408 by the instruction at line (6), thereby correcting the misprediction that was made at block 308. In one embodiment, the flushing and branching to the next sequential macroinstruction is performed by the instruction shown on line (7) of Table 3.

Although embodiments have been described in which the microprocessor has an x86 macroarchitecture, the present invention is not limited to the x86 macroarchitecture. Rather, embodiments are contemplated in which the microprocessor has a different macroarchitecture, has a superscalar microarchitecture that includes segment registers and that does not include segment register renaming hardware, yet employs the techniques described herein to speculatively execute dependent memory access instructions by predicting that a new value loaded by an older instruction into a segment register is the same as the old value of the segment register and consequently ignores dependencies by the newer memory access instructions on the segment register value, and yet insures correct program results by flushing and re-executing the dependent instructions if the new value does not equal the old value.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having a plurality of architectural segment registers, wherein the plurality of architectural segment registers comprise first and second mutually exclusive subsets, the microprocessor comprising:

a temporary register;

a memory, configured to store first and second microcode routines; and an instruction decoder, coupled to said memory, configured to encounter an instruction that specifies one of the plurality of architectural segment registers for loading a new value into, wherein said instruction decoder is configured to invoke the first microcode routine if the one of the plurality of architectural segment registers is in the first subset and to invoke the second microcode routine if the one of the plurality of architectural segment registers is in the second subset;

wherein the first microcode routine is configured to unconditionally load the new value into the one of the plurality of architectural segment registers;

wherein the second microcode routine is configured to load the new value from memory into a temporary register of the microprocessor and to compare the new value loaded into the temporary resister with a current value stored in the one of the plurality of architectural segment registers;

wherein the second microcode routine is configured to load the new value into the one of the plurality of architectural segment registers if the new value loaded into the temporary register does not equal the current value stored in the one of the plurality of architectural segment registers; and wherein the second microcode routine is configured not to load the new value into the one of the plurality of architectural segment register if the new value loaded into the temporary register equals the current value stored in the one of the plurality of architectural segment registers.

2. The microprocessor of claim 1, wherein the second subset of architectural segment registers consists of the x86 DS and ES segment registers.

3. The microprocessor of claim 1, wherein the second microcode routine is further configured to cause all instructions newer than the instruction to re-execute using the new value, if the new value does not equal a current value stored in the one of the plurality of architectural segment registers.

4. A method for improving performance in a microprocessor that includes architectural segment registers, but does not include register renaming hardware for the architectural segment registers, wherein the microprocessor is configured to execute a segment register-loading instruction that loads a new value into an architectural segment register and a memory access instruction that accesses a memory segment described by the architectural segment register, wherein the memory access instruction follows the segment register-loading instruction in program order, the method comprising:

retrieving a current value from the architectural segment register;

executing the memory access instruction using the retrieved current value;

loading the new value from memory into a temporary register of the microprocessor, prior to said determining;

determining whether the current value equals the new value, after said retrieving wherein said determining comprises comparing the new value that was loaded into the temporary register from memory with the current value in the architectural segment register;

if the new value equals the current value, then:

refraining from loading the new value into the architectural segment register; and if the new value does not equal the current value, then:

loading the new value into the architectural segment register;

retrieving the new value from the architectural segment register; and re-executing the memory access instruction using the new value retrieved from the architectural segment register.

5. The method of claim 4, further comprising:

flushing the memory access instruction from a pipeline of the microprocessor prior to said re-executing.

6. A microprocessor for executing a segment register-loading instruction that loads a new value into an architectural segment register and a memory access instruction that accesses a memory segment described by the architectural segment register, wherein the memory access instruction follows the segment register-loading instruction in program order, the microprocessor comprising:

a temporary register;

architectural segment registers that include the architectural segment register, wherein the microprocessor does not include register renaming hardware for the architectural segment registers; and a plurality of execution units, configured to:

retrieve a current value from the architectural segment register;

execute the memory access instruction using the retrieved current value;

load the new value from memory into the temporary register; and determine whether the current value equals the new value, after retrieving the current value, by comparing the new value loaded into the temporary register with the current value retrieved from the architectural segment register;

wherein if the new value equals the current value, then the microprocessor:

refrains from loading the new value into the architectural segment register; and wherein if the new value does not equal the current value, then the microprocessor:

loads the new value into the architectural segment register;

retrieves the new value from the architectural segment register; and re-executes the memory access instruction using the new value retrieved from the architectural segment register.

7. The microprocessor of claim 6, further configured to:

flush the memory access instruction from a pipeline of the microprocessor prior to re-executing the memory access instruction using the new value retrieved from the architectural segment register.

8. A method for operating a microprocessor having a plurality of architectural segment registers, wherein the plurality of architectural segment registers comprise first and second mutually exclusive subsets, the method comprising:

encountering an instruction that specifies one of the plurality of architectural segment registers for loading a new value into;

if the one of the plurality of architectural segment registers is in the first subset:

unconditionally loading the new value into the one of the plurality of architectural segment registers; and if the one of the plurality of architectural segment registers is in the second subset:

loading the new value from memory into a temporary register of the microprocessor;

comparing the new value loaded into the temporary register with a current value stored in the one of the plurality of architectural segment registers;

loading the new value into the one of the plurality of architectural segment registers if the new value loaded into the temporary register does not equal the current value stored in the one of the plurality of architectural segment registers; and refraining from loading the new value into the one of the plurality of architectural segment register if the new value loaded into the temporary register equals the current value stored in the one of the plurality of architectural segment registers.

9. The method of claim 8, wherein the second subset of architectural segment registers consists of the x86 DS and ES segment registers.

10. The method of claim 8, further comprising:

if the one of the plurality of architectural segment registers is in the second subset:

causing all instructions newer than the instruction to re-execute using the new value, if the new value loaded into the temporary register does not equal a current value stored in the one of the plurality of architectural segment registers.

11. A computer program product encoded in at least one non-transitory computer readable storage medium for use with a computing device, the computer program product comprising:

computer readable program code embodied in said medium, for specifying a microprocessor having a plurality of architectural segment registers, wherein the plurality of architectural segment registers comprise first and second mutually exclusive subsets, the computer readable program code comprising:

first program code for specifying a temporary register;

second program code for specifying a memory, configured to store first and second microcode routines; and third program code for specifying an instruction decoder, coupled to said memory, configured to encounter an instruction that specifies one of the plurality of architectural segment registers for loading a new value into, wherein said instruction decoder is configured to invoke the first microcode routine if the one of the plurality of architectural segment registers is in the first subset and to invoke the second microcode routine if the one of the plurality of architectural segment registers is in the second subset;

wherein the first microcode routine is configured to unconditionally load the new value into the one of the plurality of architectural segment registers;

wherein the second microcode routine is configured to load the new value from memory into a temporary register of the microprocessor and to compare the new value loaded into the temporary register with a current value stored in the one of the plurality of architectural segment registers;

wherein the second microcode routine is configured to load the new value into the one of the plurality of architectural segment registers if the new value loaded into the temporary register does not equal the current value stored in the one of the plurality of architectural segment registers; and wherein the second microcode routine is configured not to load the new value into the one of the plurality of architectural segment register if the new value loaded into the temporary register equals the current value stored in the one of the plurality of architectural segment registers.

12. The computer program product of claim 11, wherein the at least one computer readable storage medium is selected from the set of a disk, tape, or other magnetic, optical, or electronic storage medium and a network, wire line, wireless or other communications medium.

13. A computer program product encoded in at least one non-transitory computer readable storage medium for use with a computing device, the computer program product comprising:

computer readable program code embodied in said medium, for specifying a microprocessor for executing a segment register-loading instruction that loads a new value into an architectural segment register and a memory access instruction that accesses a memory segment described by the architectural segment register, wherein the memory access instruction follows the segment register-loading instruction in program order, the computer readable program code comprising:

first program code for specifying a temporary register;

second program code for specifying architectural segment registers that include the architectural segment register, wherein the microprocessor does not include register renaming hardware for the architectural segment registers; and program code for specifying a plurality of execution units, configured to:

retrieve a current value from the architectural segment register;

execute the memory access instruction using the retrieved current value;

load the new value from memory into the temporary register; and determine whether the current value equals the new value, after retrieving the current value;

wherein if the new value equals the current value, then the microprocessor;

refrains from loading the new value into the architectural segment register; and wherein if the new value does not equal the current value, then the microprocessor;

loads the new value into the architectural segment register;

retrieves the new value from the architectural segment register; and re-executes the memory access instruction using the new value retrieved from the architectural segment register.

14. The computer program product of claim 13, wherein the at least one computer readable storage medium is selected from the set of a disk, tape, or other magnetic, optical, or electronic storage medium and a network, wire line, wireless or other communications medium.

* * * * *